(12) United States Patent
Binek et al.

(10) Patent No.: US 12,208,884 B2
(45) Date of Patent: Jan. 28, 2025

(54) AERIAL VEHICLE FLUID CONTROL SYSTEM INTEGRATED WITH GAS TURBINE ENGINE

(71) Applicant: Raytheon Technologies Corporation, Farmington, CT (US)

(72) Inventors: Lawrence A. Binek, Glastonbury, CT (US); Jose R. Paulino, Jupiter, FL (US); Sean R. Jackson, Palm City, FL (US)

(73) Assignee: RTX CORPORATION, Farmington, CT (US)

( * ) Notice: Subject to any disclaimer, the term of this patent is extended or adjusted under 35 U.S.C. 154(b) by 110 days.

(21) Appl. No.: 17/902,245

(22) Filed: Sep. 2, 2022

(65) Prior Publication Data

US 2024/0076033 A1    Mar. 7, 2024

(51) Int. Cl.
*B64C 21/01* (2023.01)
*F02C 6/08* (2006.01)

(52) U.S. Cl.
CPC .............. *B64C 21/01* (2023.01); *F02C 6/08* (2013.01); *B64C 2230/06* (2013.01); *F05D 2220/323* (2013.01); *F05D 2260/605* (2013.01); *F05D 2260/606* (2013.01)

(58) Field of Classification Search
CPC ....... B64C 21/01; B64C 21/02; B64C 21/025; B64C 21/04; B64C 21/08; B64C 23/00; B64C 2230/06; F02C 6/06
See application file for complete search history.

(56) References Cited

U.S. PATENT DOCUMENTS

| | | | |
|---|---|---|---|
| 3,262,658 A * | 7/1966 | Reilly | B64C 23/00 244/207 |
| 4,099,671 A | 7/1978 | Leibach | |
| 4,099,691 A * | 7/1978 | Swanson | B64C 21/04 244/134 B |
| 4,169,567 A * | 10/1979 | Tamura | B64C 27/16 244/17.11 |
| 4,589,594 A | 5/1986 | Kranz | |
| 5,114,100 A * | 5/1992 | Rudolph | B64C 21/06 244/130 |
| 5,125,597 A * | 6/1992 | Coffinberry | F02C 7/277 454/71 |
| 5,143,329 A * | 9/1992 | Coffinberry | F02C 7/32 244/209 |

(Continued)

FOREIGN PATENT DOCUMENTS

| | | | | |
|---|---|---|---|---|
| CN | 104712459 A | 6/2015 | | |
| CN | 107448239 A * | 12/2017 | | F01D 5/145 |

(Continued)

OTHER PUBLICATIONS

EP search report for EP23195234.2 dated Jun. 4, 2024.

*Primary Examiner* — Benjamin P Lee
(74) *Attorney, Agent, or Firm* — Getz Balich LLC

(57) ABSTRACT

An assembly is provided for an aerial vehicle. This assembly includes an airframe and a fluid circuit. The airframe includes a body and an airfoil projecting out from the body. The airfoil includes a first surface and a first aperture in the first surface. The fluid circuit is configured to bleed gas from a gas turbine engine mounted to the airframe to provide control gas. The fluid circuit is configured to selectively direct the control gas to the first aperture.

17 Claims, 13 Drawing Sheets

(56) References Cited

U.S. PATENT DOCUMENTS

| | | | | |
|---|---|---|---|---|
| 5,813,625 | A * | 9/1998 | Hassan | B64C 27/467 244/17.11 |
| 6,216,982 | B1 * | 4/2001 | Pfennig | B64C 21/06 244/209 |
| 6,363,094 | B1 * | 3/2002 | Morton | H01S 3/0385 372/59 |
| 6,685,143 | B1 * | 2/2004 | Prince | F42B 10/64 244/203 |
| 6,994,297 | B1 * | 2/2006 | Hassan | B64C 23/04 244/207 |
| 7,255,309 | B2 * | 8/2007 | Boldrin | B64C 21/08 417/413.1 |
| 7,628,352 | B1 * | 12/2009 | Low | F42B 10/62 244/3.21 |
| 7,708,229 | B1 * | 5/2010 | Angle, II | B64C 21/08 244/206 |
| 8,128,036 | B2 * | 3/2012 | Boldrin | B64C 21/08 417/413.1 |
| 8,299,411 | B2 * | 10/2012 | Wong | F42B 10/64 244/3.28 |
| 8,382,043 | B1 * | 2/2013 | Raghu | F15D 1/008 244/1 N |
| 9,272,772 | B2 * | 3/2016 | Reckzeh | B64C 21/04 |
| 9,278,753 | B2 * | 3/2016 | Reckzeh | B64C 23/069 |
| 9,862,482 | B2 * | 1/2018 | Huynh | B64C 21/08 |
| 10,723,443 | B2 * | 7/2020 | Ruppert | B64C 21/025 |
| 11,192,637 | B2 * | 12/2021 | Giannini | B64C 21/08 |
| 11,338,909 | B1 * | 5/2022 | Alhussan | B64C 21/08 |
| 11,345,463 | B1 * | 5/2022 | Alhussan | F04D 29/30 |
| 11,472,536 | B1 * | 10/2022 | Alhussan | B64C 3/00 |
| 2006/0027711 | A1 * | 2/2006 | Boldrin | B64C 21/08 244/204 |
| 2008/0302991 | A1 | 12/2008 | Tseng | |
| 2013/0062473 | A1 * | 3/2013 | Golling | B64C 21/025 244/201 |
| 2013/0133334 | A1 | 5/2013 | Strecker | |
| 2013/0164115 | A1 | 6/2013 | Sennoun | |
| 2013/0291981 | A1 * | 11/2013 | Lengers | B64C 21/04 137/825 |
| 2013/0320150 | A1 * | 12/2013 | Reckzeh | B64C 21/02 244/199.4 |
| 2014/0061387 | A1 * | 3/2014 | Reckzeh | B64C 21/04 244/209 |
| 2016/0107746 | A1 * | 4/2016 | Tiwari | B23K 26/382 219/121.72 |
| 2017/0267332 | A1 * | 9/2017 | Ruppert | B64C 21/025 |
| 2020/0115040 | A1 * | 4/2020 | Giannini | B64C 9/18 |
| 2023/0105213 | A1 * | 4/2023 | Johnson | F01D 25/28 415/211.2 |

FOREIGN PATENT DOCUMENTS

| | | | |
|---|---|---|---|
| DE | 2821913 A1 * | 11/1979 | B64C 21/04 |
| FR | 2425978 A1 * | 1/1981 | B64C 21/04 |
| GB | 1019061 A * | 2/1966 | |
| RU | 2165585 C1 | 4/2001 | |
| RU | 2372251 C1 * | 11/2009 | |

* cited by examiner

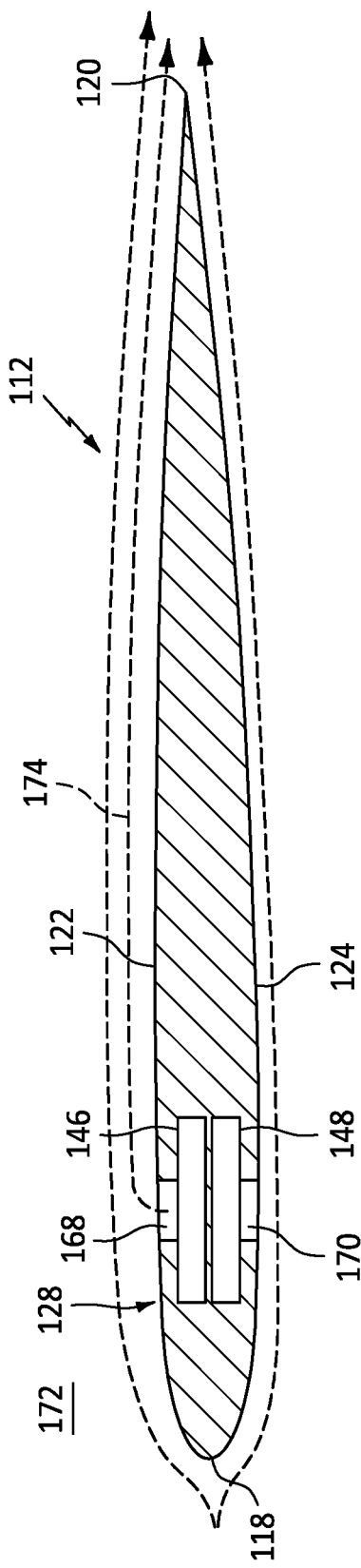
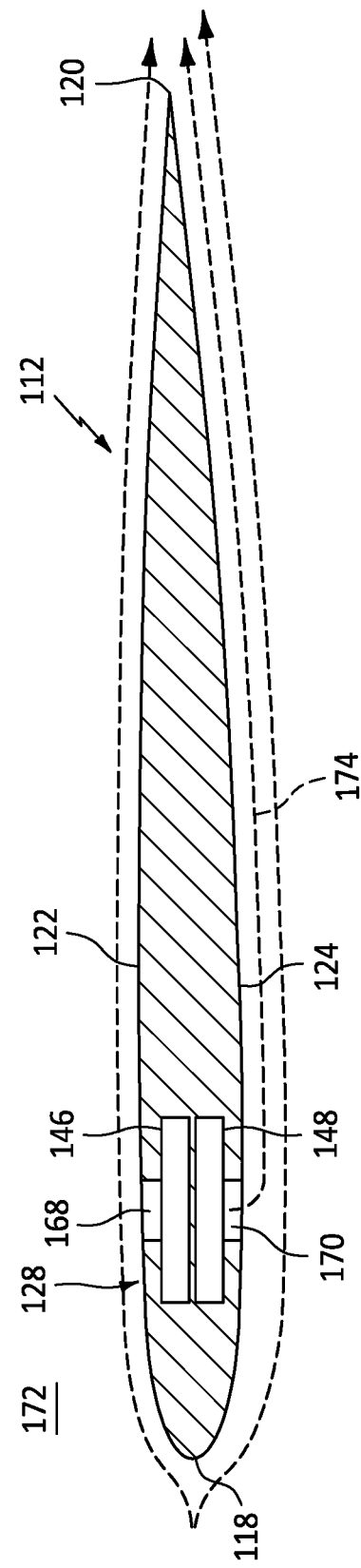
FIG. 10A
FIG. 10B

AERIAL VEHICLE FLUID CONTROL SYSTEM INTEGRATED WITH GAS TURBINE ENGINE

BACKGROUND OF THE DISCLOSURE

1. Technical Field

This disclosure relates generally to a fluid system and, more particularly, to a fluid control system for a gas turbine engine.

2. Background Information

An aerial vehicle such as an aircraft and/or a gas turbine engine powering the aircraft may include various fluid systems for controlling aircraft and/or engine operation. The aircraft may also include a discrete flight control system for maneuvering the aircraft during flight. Various types and configurations of fluid systems and flight control systems are known in the art. While these known fluid systems and flight control systems have various benefits, there is still room in the art for improvement.

SUMMARY OF THE DISCLOSURE

According to an aspect of the present disclosure, an assembly is provided for an aerial vehicle. This assembly includes an airframe and a fluid circuit. The airframe includes a body and an airfoil projecting out from the body. The airfoil includes a first surface and a first aperture in the first surface. The fluid circuit is configured to bleed gas from a gas turbine engine mounted to the airframe to provide control gas. The fluid circuit is configured to selectively direct the control gas to the first aperture.

According to another aspect of the present disclosure, another assembly is provided for an aerial vehicle. This assembly includes a gas turbine engine, a control surface and a fluid circuit. The gas turbine engine includes a compressor section. The control surface includes an airfoil outside of the gas turbine engine. The airfoil includes a first surface and a first aperture in the first surface. The fluid circuit is configured to bleed gas from the compressor section to provide control gas. The fluid circuit is configured to selectively exhaust the control gas through the first aperture along the first surface to change a first aerodynamic characteristic of the airfoil.

According to still another aspect of the present disclosure, another assembly is provided for an aerial vehicle. This assembly includes a gas turbine engine, a control surface and a fluid circuit. The gas turbine engine includes a stationary structure and a rotating structure at least partially housed within the stationary structure. The control surface is configured as or otherwise includes an airfoil. The airfoil includes a first surface and a first aperture in the first surface. The fluid circuit is configured to bleed gas from the gas turbine engine through an inlet to provide control gas. The fluid circuit is configured to selectively direct the control gas from the inlet to the first aperture through a manifold between the gas turbine engine and the control surface. The stationary structure and the manifold are included in a monolithic body.

The airfoil may also include a second surface and a second aperture in the second surface. The airfoil may extend laterally between the first surface and the second surface. The fluid circuit may also be configured to selectively exhaust the control gas through the second aperture along the second surface to change a second aerodynamic characteristic of the airfoil.

The fluid circuit may be arranged with an inlet and a flow regulator. The inlet may be configured to bleed the gas from the compressor section. The flow regulator may be configured to fluidly couple the inlet to the first aperture during a first mode. The flow regulator may be configured to fluidly decouple the inlet from the first aperture during a second mode.

The gas turbine engine may include a stationary structure and a rotating structure at least partially housed within the stationary structure. The fluid circuit may include a manifold between the gas turbine engine and the airfoil. The manifold may fluidly couple the compressor section and the first aperture. The stationary structure and the manifold may be included in a monolithic body.

The first aperture may be configured to exhaust the control gas along the first surface to change an aerodynamic profile of the airfoil using the control gas.

The fluid circuit may be configured to selectively direct the control gas to the first aperture to maneuver the aerial vehicle.

The airfoil may extend laterally between the first surface and a second surface. The airfoil may include a second aperture in the second surface. The fluid circuit may also be configured to selectively direct the control gas to the second aperture.

The fluid circuit may direct the control gas to the first aperture during a first mode. The fluid circuit may direct the control gas to the second aperture during a second mode.

The assembly may also include an inlet and a flow regulator. The inlet may be configured to bleed the gas from the gas turbine engine. The flow regulator may be configured to fluidly couple the inlet to the first aperture during a first mode. The flow regulator may be configured to fluidly couple the inlet to the second aperture during a second mode.

The flow regulator may be configured to fluidly decouple the inlet from the second aperture during the first mode. The flow regulator may be configured to fluidly decouple the inlet from the first aperture during the second mode.

The flow regulator may be configured to fluidly decouple the inlet from the first aperture and the second aperture during a third mode.

The gas turbine engine may include a stationary structure and a rotating structure at least partially housed within the stationary structure. The fluid circuit may include a manifold with a first passage between the gas turbine engine and the airfoil. The first passage may fluidly couple the gas turbine engine and the first aperture. The stationary structure and the manifold may be included in a monolithic body.

The airfoil may extend laterally between the first surface and a second surface. The airfoil may include a second aperture in the second surface. The fluid circuit may also be configured to selectively direct the control gas to the second aperture. The manifold may also include a second passage between the gas turbine engine and the airfoil. The second passage may fluidly couple the gas turbine engine and the second aperture.

The fluid circuit may also include a flow regulator upstream of the first passage and the second passage.

The gas turbine engine may include a stationary structure and a rotating structure at least partially housed within the stationary structure. The airfoil may be fixedly connected to the stationary structure.

The gas turbine engine may include a compressor section. The fluid circuit may be configured to bleed the gas from the compressor section to provide the control gas.

The gas turbine engine may be housed within the body.

The gas turbine engine may be configured to provide thrust for propelling the aerial vehicle.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 10A and 10B are cross-sectional illustrations of the airfoil during various modes of operation.

DETAILED DESCRIPTION

Figure 1:
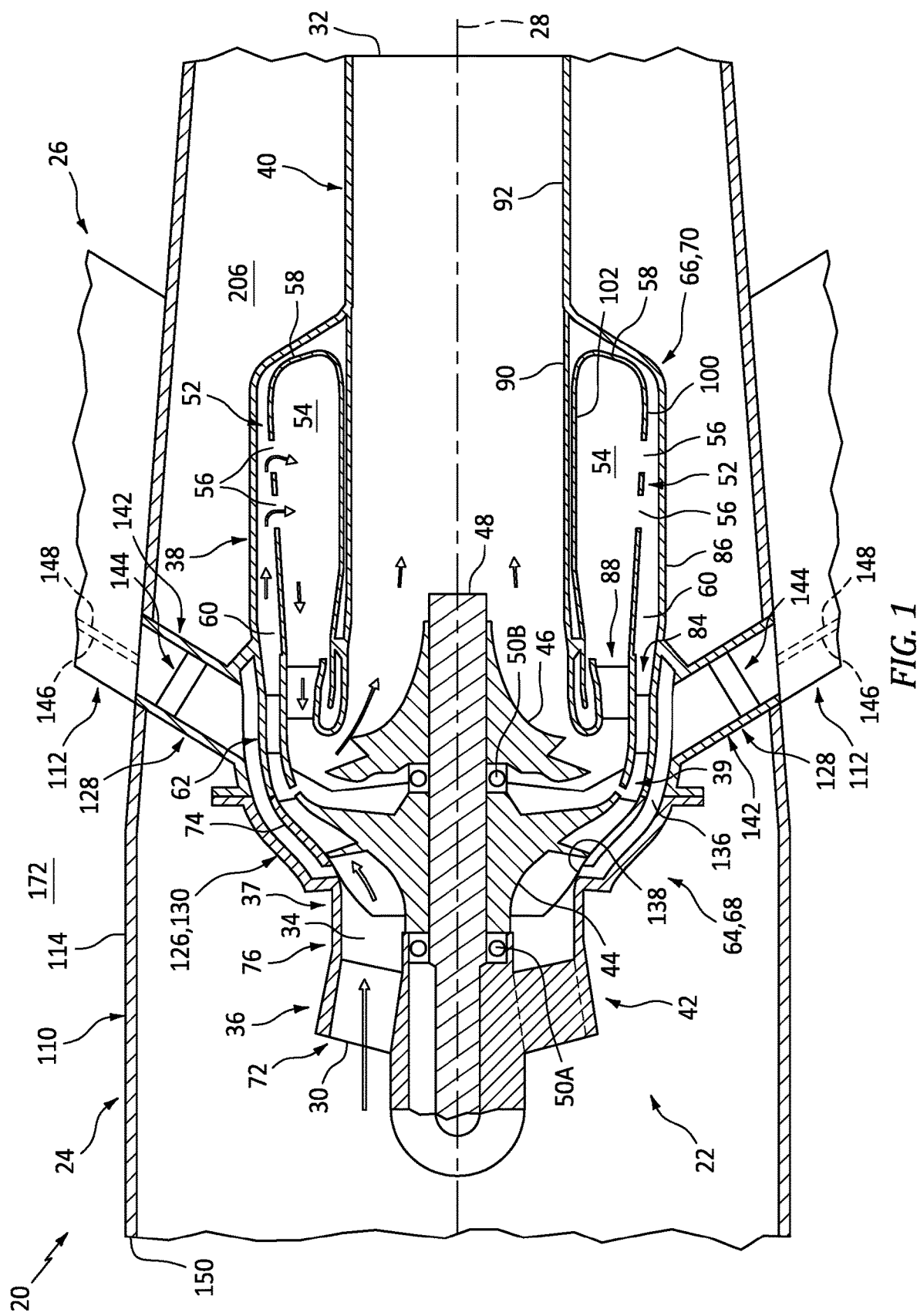
FIG. 1 is a partial side sectional illustration of an assembly for an aerial vehicle.

FIG. 1 illustrates an assembly 20 for an aerial vehicle such as, but not limited to, an unmanned aerial vehicle (UAV), a drone or any other manned or unmanned aircraft or self-propelled projectile. The vehicle assembly 20 of FIG. 1 includes a gas turbine engine 22, a vehicle airframe 24 and a fluid control system 26 that integrates the gas turbine engine 22 with the vehicle airframe 24 to provide, for example, vehicle flight control.

The gas turbine engine 22 of FIG. 1 is configured as a single spool, radial-flow turbojet gas turbine engine. This gas turbine engine 22 is configured for propelling the aerial vehicle. The present disclosure, however, is not limited to such an exemplary turbojet gas turbine engine configuration nor to a vehicle propulsion system application. For example, the gas turbine engine 22 may alternatively be configured as an auxiliary power unit (APU) for the aerial vehicle.

The gas turbine engine 22 of FIG. 1 extends axially along an axial centerline 28 between a forward, upstream airflow inlet 30 into the gas turbine engine 22 and an aft, downstream exhaust 32 out of the gas turbine engine 22. This axial centerline 28 may be a centerline axis of the gas turbine engine 22 and the vehicle body 110. The axial centerline 28 may also or alternatively be a rotational axis for one or more components within the gas turbine engine 22.

The gas turbine engine 22 includes a core flowpath 34, an inlet section 36, a (e.g., radial flow) compressor section 37, a (e.g., reverse flow) combustor section 38, a (e.g., radial flow) turbine section 39 and an exhaust section 40. The gas turbine engine 22 also includes a static engine structure 42 housing and/or forming one or more or all of the engine section 36-40.

The core flowpath 34 extends within the gas turbine engine 22 between the engine inlet 30 and the engine exhaust 32. More particularly, the core flowpath 34 extends sequentially through the inlet section 36, the compressor section 37, the combustor section 38, the turbine section 39 and the exhaust section 40 from the engine inlet 30 to the engine exhaust 32.

The compressor section 37 includes a bladed compressor rotor 44. The turbine section 39 includes a bladed turbine rotor 46. Each of these engine rotors 44, 46 includes a plurality of rotor blades arranged circumferentially around and connected to at least one respective rotor disk and/or hub. The rotor blades, for example, may be formed integral with or mechanically fastened, welded, brazed, adhered and/or otherwise attached to the respective rotor disk(s) and/or hub(s).

The compressor rotor 44 may be configured as a radial flow compressor rotor. The turbine rotor 46 may be configured as a radial flow turbine rotor. The compressor rotor 44 is connected to the turbine rotor 46 through an engine shaft 48. This engine shaft 48 is rotatably supported by the static engine structure 42 through a plurality of bearings 50A and 50B (generally referred to as 50); e.g., rolling element bearings, journal bearings, etc.

The combustor section 38 includes an annular combustor 52 with an annular combustion chamber 54. The combustor 52 of FIG. 1 is configured as a reverse flow combustor. Inlets ports 56/flow tubes into the combustion chamber 54, for example, may be arranged at (e.g., on, adjacent or proximate) and/or towards an aft bulkhead wall 58 of the combustor 52. An outlet from the combustor 52 may be arranged axially aft of an inlet to the turbine section 39. The combustor 52 may also be arranged radially outboard of and/or axially overlap at least a portion (e.g., aft portion) of the turbine section 39. With this arrangement, the core flowpath 34 of FIG. 1 reverses direction (e.g., from a forward-to-aft direction to an aft-to-forward direction) a first time as the core flowpath 34 extends from a diffuser plenum 60 surrounding the combustor 52 into the combustion chamber 54. The core flowpath 34 of FIG. 1 then reverses its direction (e.g., from the aft-to-forward direction to the forward-to-aft direction) a second time as the core flowpath 34 extends from the combustion chamber 54 into the turbine section 39.

During operation, air enters the gas turbine engine 22 through the inlet section 36 and its engine inlet 30. The inlet section 36 directs this air from the engine inlet 30 into the core flowpath 34 and the compressor section 37. The air within the core flowpath 34 may be referred to as core air.

This core air is compressed by the compressor rotor 44 and directed through a diffuser 62 and its plenum 60 into the combustion chamber 54. Fuel is injected and mixed with the compressed core air to provide a fuel-air mixture. This fuel-air mixture is ignited within the combustion chamber 54, and combustion products thereof flow through the turbine section 39 and cause the turbine rotor 46 to rotate. The rotation of the turbine rotor 46 drives rotation of the compressor rotor 44 and, thus, compression of the air received from the engine inlet 30. The exhaust section 40 receives the combustion products from the turbine section 39. The exhaust section 40 directs the received combustion products out of the gas turbine engine 22 to provide forward engine thrust.

The static engine structure 42 of FIG. 1 includes one or more stationary structures 64 and 66. These stationary structures 64 and 66 are configured as discrete sub-structures (e.g., axial sections) of the static engine structure 42. The forward, upstream stationary structure 64 and/or the aft, downstream stationary structure 66 may each be formed as (or part of) a monolithic body 68, 70 (e.g., a monolithic vehicle component), respectively. Herein, the term "monolithic" may describe a component of the vehicle which is formed as a single unitary body. Each stationary structure 64, 66, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another.

The upstream stationary structure 64 may form a section of the static engine structure 42 along any one or more or all of the engine sections 36 and 37. The upstream stationary structure 64 of FIG. 2, for example, includes an inlet nozzle 72 and at least a forward, upstream section 74 (or an entirety) of a compressor case 76. The upstream stationary structure 64 may also include an internal support structure for at least one of the bearings 50; e.g., the forward bearing 50A.

The inlet nozzle 72 is disposed within the inlet section 36, for example, at the engine inlet 30. This inlet nozzle 72 may be configured to condition the core air entering the compressor section 37. The inlet nozzle 72 of FIG. 2, for example, includes one or more inlet guide vanes 78 configured to impart swirl to the core air. These inlet guide vanes 78 are arranged circumferentially about the axial centerline 28 in an annular array; e.g., an inlet nozzle vane array. Each of the inlet guide vanes 78 extends radially across the core flowpath 34 between and is connected to an inner platform 80 of the inlet nozzle 72 and an outer platform 82 of the inlet nozzle 72.

The compressor case 76 houses the compressor section 37 and its compressor rotor 44. The compressor case 76, for example, extends circumferentially about (e.g., circumscribes) and axially overlaps the compressor rotor 44. The compressor case 76 may thereby form an outer peripheral boundary of the core flowpath 34 within the compressor section 37.

The downstream stationary structure 66 may form a section of the static engine structure 42 along any one or more or all of the engine sections 38-40; see also FIG. 1. The downstream stationary structure 66 of FIG. 2, for example, includes a diffuser nozzle 84, an outer diffuser (e.g., plenum) case 86, the combustor 52, a turbine nozzle 88, a turbine case 90 and an exhaust case 92; see also FIG. 1. The downstream stationary structure 66 may also include an internal support structure for at least one of the bearings 50; e.g., the aft bearing 50B.

The diffuser nozzle 84 is disposed within the diffuser 62 upstream of the plenum 60. This diffuser nozzle 84 may be configured to condition the core air leaving the compressor section 37 and entering the plenum 60. The diffuser nozzle 84 of FIG. 2, for example, includes one or more diffuser guide vanes 94 configured to impart swirl to the core air. These diffuser guide vanes 94 are arranged circumferentially about the axial centerline 28 in an annular array; e.g., a diffuser nozzle vane array. Each of the diffuser guide vanes 94 extends radially across the core flowpath 34 between and is connected to an inner platform 96 of the diffuser nozzle 84 and an outer platform 98 of the diffuser nozzle 84.

The diffuser case 86 houses the combustor 52 within the combustor section 38. The diffuser case 86, for example, extends circumferentially about (e.g., circumscribes), axially overlaps and is spaced radially outward from the combustor 52. The diffuser case 86 may thereby form an outer peripheral boundary of the core flowpath 34 and the plenum 60 along the combustor 52. The outer platform 98 of the diffuser nozzle 84 may be formed as a forward, upstream extension of the diffuser case 86.

Figure 2:
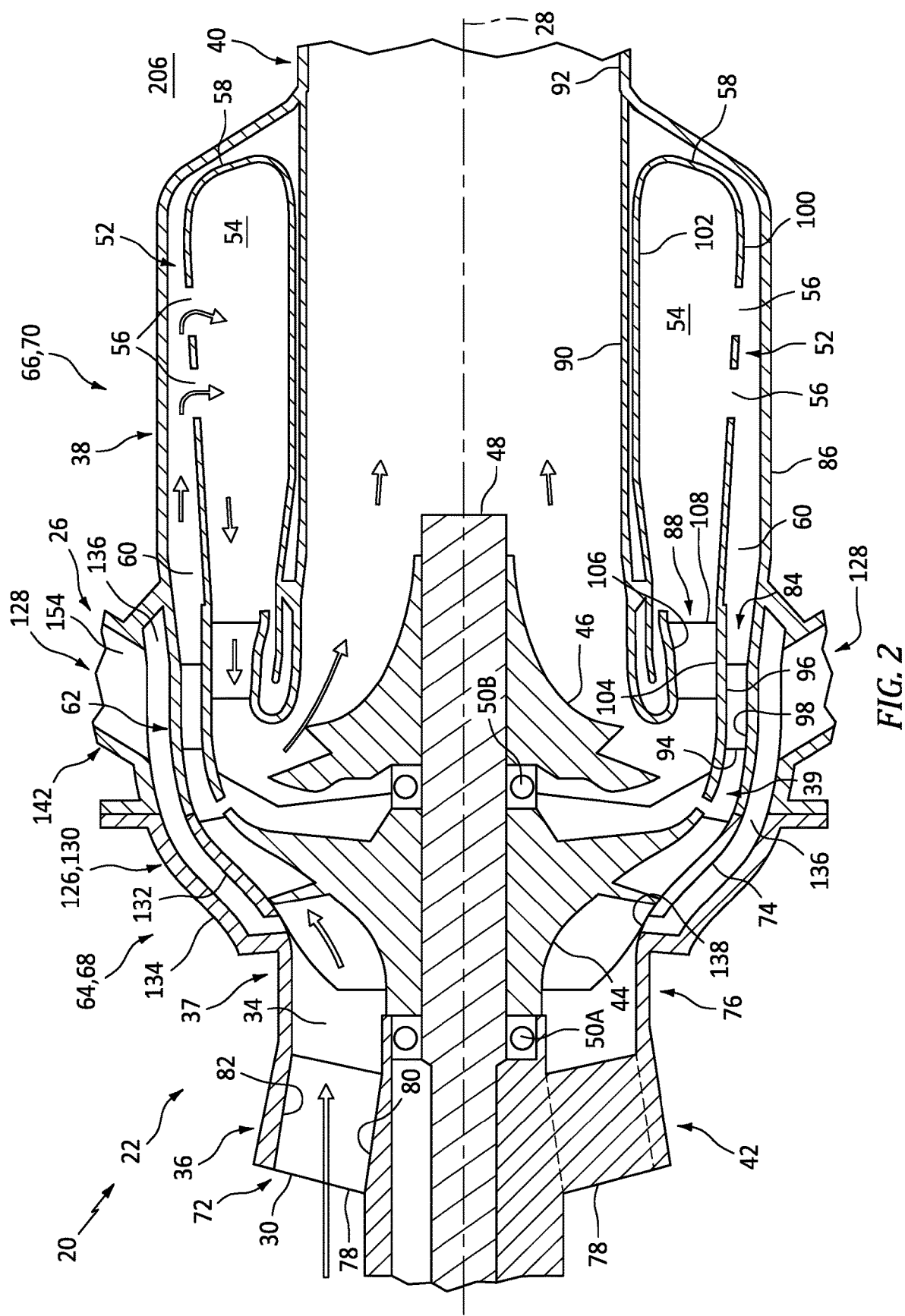
FIG. 2 is a partial side sectional illustration of the vehicle assembly at a central portion of a gas turbine engine.

The combustor 52 of FIG. 2 includes an outer combustor wall 100, an inner combustor wall 102 and the bulkhead wall 58. The outer combustor wall 100 extends axially between and may be connected to an outer platform 104 of the turbine nozzle 88 and the bulkhead wall 58. The outer combustor wall 100 extends circumferentially about (e.g., circumscribes), axially overlaps and is spaced radially outward from the inner combustor wall 102. The inner combustor wall 102 extends axially between an inner platform 106 of the turbine nozzle 88 and the bulkhead wall 58, and the inner combustor wall 102 may be connected to the bulkhead wall 58. The inner combustor wall 102 extends circumferentially about (e.g., circumscribes), axially overlaps and is spaced radially outward from the turbine case 90. The bulkhead wall 58 extends radially between the outer combustor wall 100 and the inner combustor wall 102, at aft ends of the combustor walls 100 and 102. With this arrangement, the combustor walls 58, 100 and 102 collectively form peripheral boundaries of the combustion chamber 54 within the combustor 52.

The turbine nozzle 88 is disposed within the turbine section 39, for example, at an intersection between the combustor section 38 and the turbine section 39. This turbine nozzle 88 may be configured to condition the combustion products leaving the combustor section 38 and its combustion chamber 54 and entering the turbine section 39. The turbine nozzle 88 of FIG. 2, for example, includes one or more turbine guide vanes 108 configured to impart swirl to the combustion products. These turbine guide vanes 108 are arranged circumferentially about the axial centerline 28 in an annular array; e.g., a turbine nozzle vane array. Each of the turbine guide vanes 108 extends radially across the core flowpath 34 between and is connected to the inner platform 106 of the turbine nozzle 88 and the outer platform 104 of the turbine nozzle 88.

The turbine case 90 houses at least a portion of the turbine section 39 and its turbine rotor 46. The turbine case 90, for example, extends circumferentially about (e.g., circumscribes) and axially overlaps at least a portion (e.g., an aft, downstream portion) of the turbine rotor 46. The turbine case 90 may thereby form an outer peripheral boundary of the core flowpath 34 within at least a portion (e.g., an aft, downstream portion) of the compressor section 37.

Referring to FIG. 1, the exhaust case 92 extends axially from one or more of the diffuser case 86 and/or the turbine case 90 to the engine exhaust 32. The exhaust case 92 may also be connected to the diffuser case 86 and/or the turbine case 90 at aft ends thereof. The exhaust case 92 extends circumferentially about (e.g., completely around) the axial centerline 28. The exhaust case 92 may thereby form an outer peripheral boundary of the core flowpath 34 within the exhaust section 40 to the engine exhaust 32.

An aft, downstream end of the upstream stationary structure 64 is mated with and connected to a forward, upstream end of the downstream stationary structure 66. The upstream stationary structure 64 of FIG. 1, for example, is attached to the downstream stationary structure 66 by at least one mechanical joint; e.g., a bolted flange connection. However, in other embodiments, the upstream stationary structure 64 may also or alternatively be attached to the downstream stationary structure 66 by at least one bond joint; e.g., a braze connection, a welded connection, etc.

The gas turbine engine 22 is arranged with and mounted to the vehicle airframe 24. The vehicle airframe 24 of FIG. 1, for example, includes a vehicle body 110 and one or more vehicle airfoils 112. The gas turbine engine 22 may be (e.g., completely) housed within the vehicle airframe 24 and its vehicle body 110. The vehicle body 110 forms an outer (e.g., exterior) aerodynamic surface 114 for the aerial vehicle; see also FIG. 3. The vehicle body 110, for example, may be configured as a nacelle for the gas turbine engine 22. The vehicle body 110 may also or alternatively be configured as a fuselage and/or another airframe component for the aerial vehicle.

Figure 3:
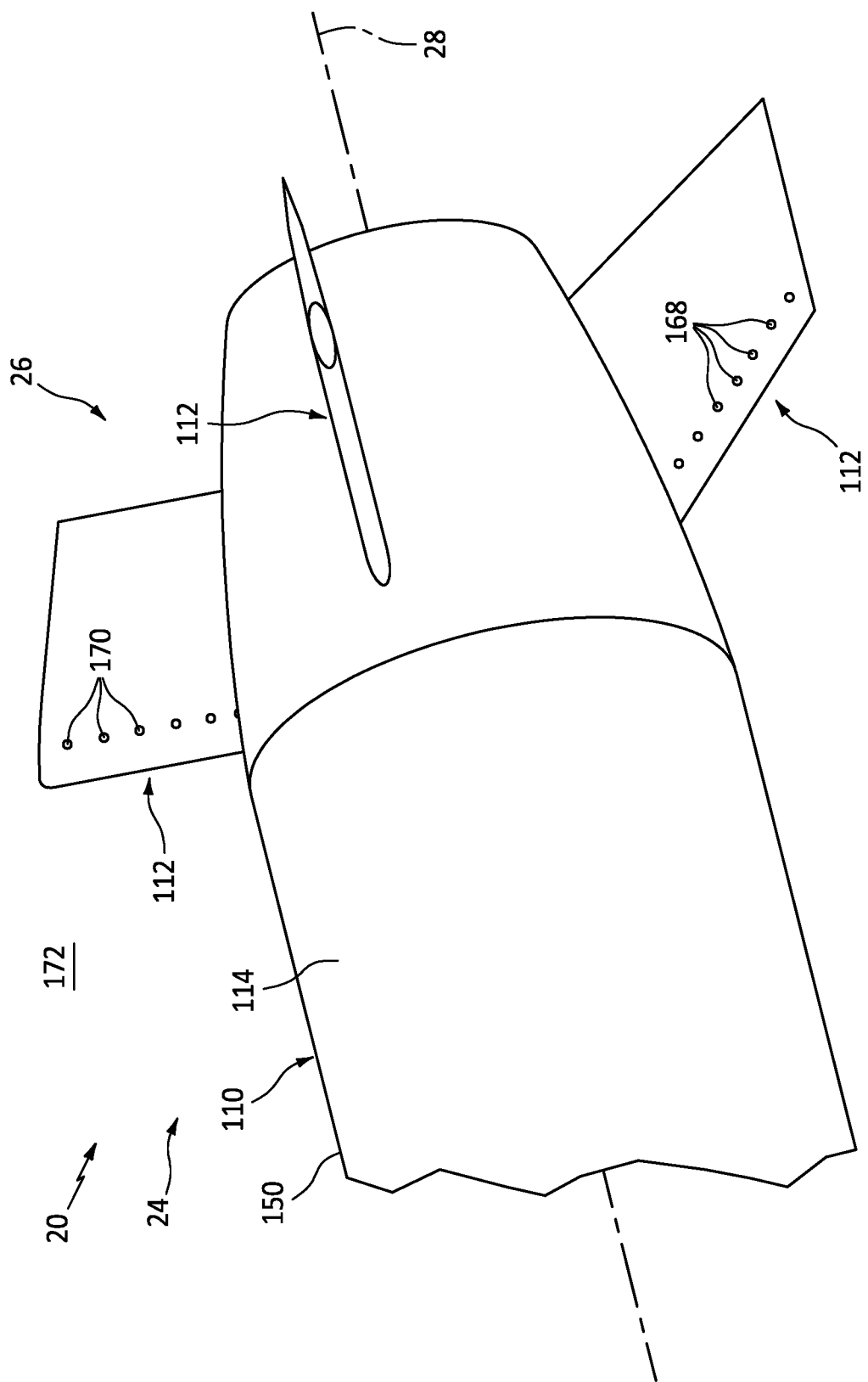
FIG. 3 is a perspective illustration of a portion of a vehicle body.
Figure 5:
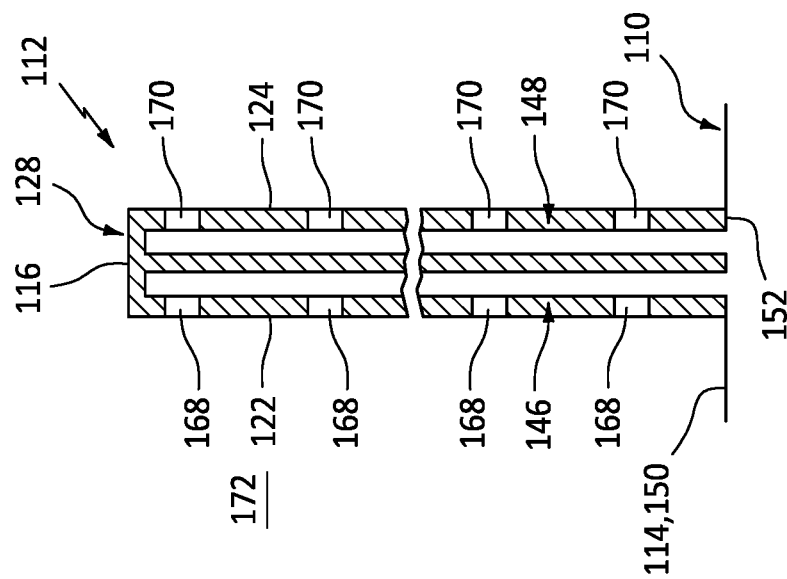
FIG. 5 is a sectional illustration of a portion of the vehicle body at the airfoil.
Figure 4:
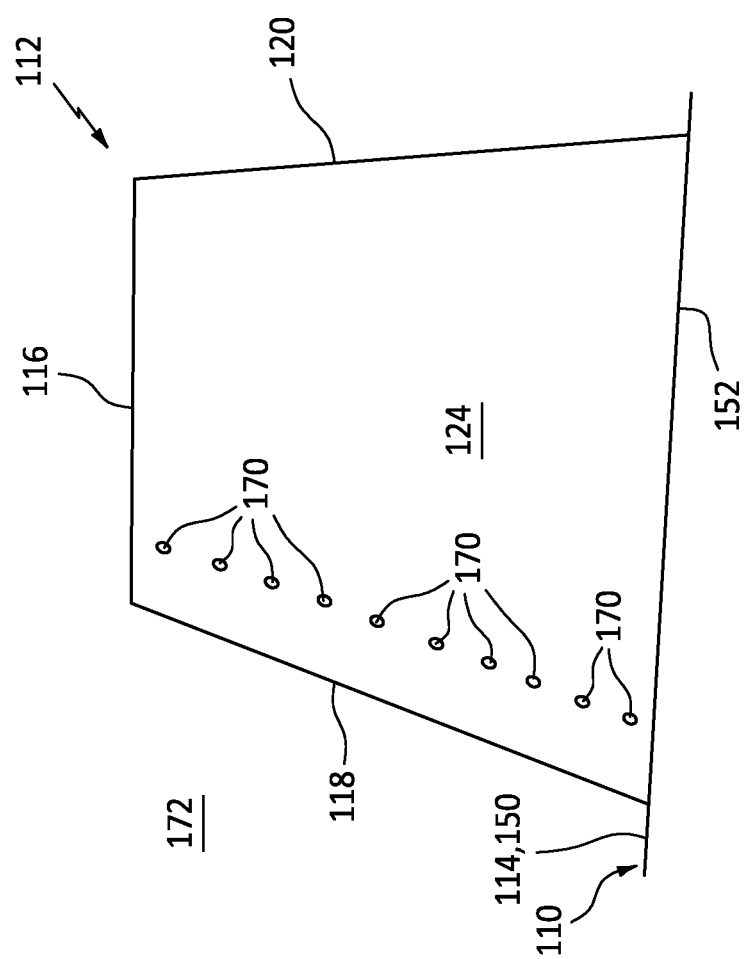
FIG. 4 is a side illustration of a portion of the vehicle body at an airfoil forming a control surface for the aerial vehicle.

Referring to FIG. 3, each of the vehicle airfoils 112 may be configured as a wing, a stabilizer and/or any other type of projection including and/or forming a control surface for the vehicle. The vehicle airfoils 112 of FIG. 3 are distributed circumferentially about the vehicle body 110 and the axial centerline 28. Referring to FIGS. 4 and 5, each of the vehicle airfoils 112 may be connected to the vehicle body 110. Each of the vehicle airfoils 112 projects spanwise (e.g., radially relative to the axial centerline 28) along a span line of the respective vehicle airfoil 112 out from the vehicle body 110 to a tip 116 of the respective vehicle airfoil 112. Each vehicle airfoil 112 of FIGS. 4 and 6 extends chordwise along a chord line of the respective vehicle airfoil 112 between and to a leading edge 118 of the respective vehicle airfoil 112 and a trailing edge 120 of the respective vehicle airfoil 112. Each vehicle airfoil 112 of FIGS. 5 and 6 has an exterior first surface 122 and an exterior second surface 124, and extends laterally between and to its first surface 122 and its second surface 124. The first surface 122 and the second surface 124 of FIG. 6 extend chordwise between and may meet at the respective leading edge 118 and the respective trailing edge 120. The first surface 122 and the second surface 124 of FIG. 5 extend spanwise from the vehicle body 110 to (and may meet at) the respective airfoil tip 116.

Referring to FIG. 1, the fluid control system 26 includes a system intake 126 and one or more fluid circuits 128, where each fluid circuit 128 may be (e.g., uniquely) associated with a respective one of the vehicle airfoils 112. The system intake 126 may be configured as or otherwise includes an intake duct 130; e.g., a bleed duct. Referring to FIG. 2, the intake duct 130 is formed by and is radially between an inner duct wall 132 and an outer duct wall 134. The inner duct wall 132 of FIG. 2 may be formed by/include at least the downstream section 74 of the compressor case 76 and at least a forward, upstream section of the diffuser case 86. The outer duct wall 134 extends circumferentially about (e.g., circumscribes), axially overlaps and is spaced radially outward from the inner duct wall 132. A forward, upstream section of the outer duct wall 134 may be formed by/included in the upstream stationary structure 64. An aft, downstream section of the outer duct wall 134 may be formed by/included in the downstream stationary structure 66.

Figure 7B:
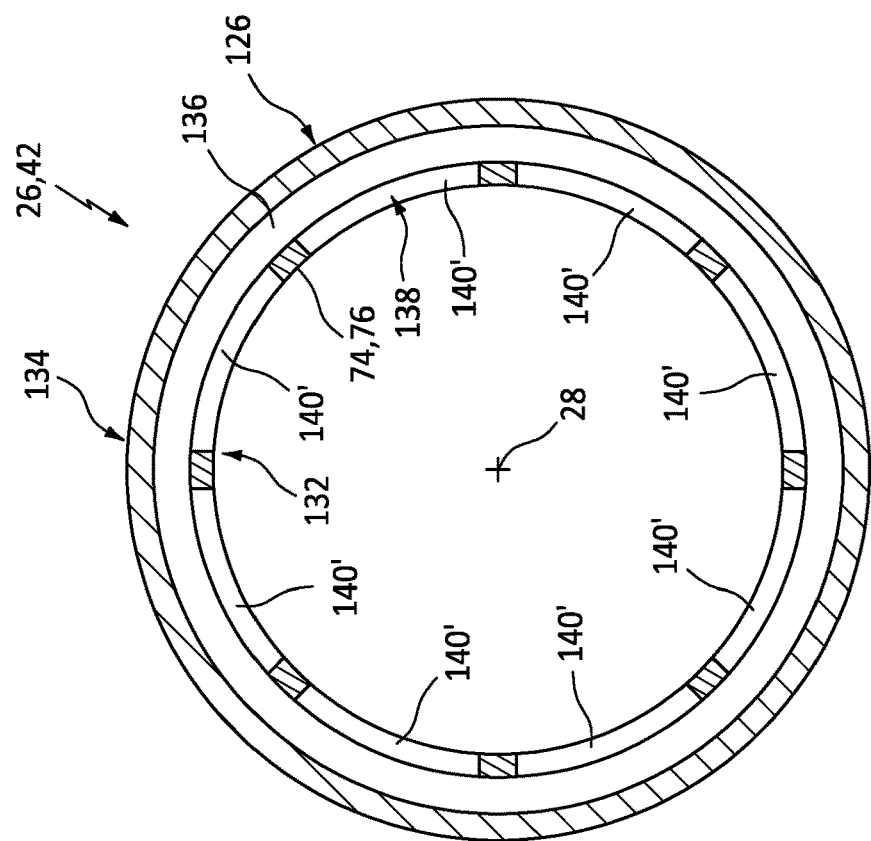
FIGS. 7A and 7B are cross-sectional illustrations of an intake duct at an inlet with various inlet aperture arrangements.
Figure 7A:
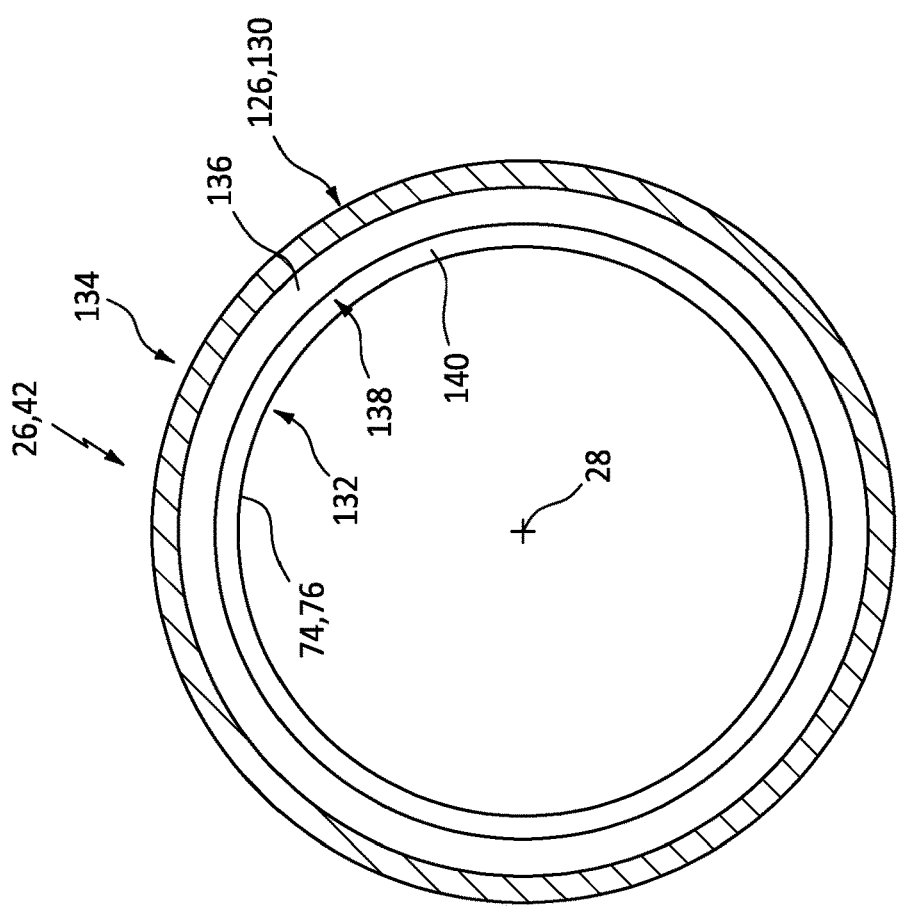

The intake duct 130 has an (e.g., annular or arcuate) interior flowpath 136 between the inner duct wall 132 and the outer duct wall 134. This duct flowpath 136 is fluidly coupled with the core flowpath 34 through an inlet 138 to the fluid control system 26. Referring to FIG. 7A, the system inlet 138 may be configured from a single inlet aperture 140 through the compressor case 76. This inlet aperture 140 may be an annular slot which extends circumferentially (e.g., uninterrupted) completely around the axial centerline 28. Alternatively, referring to FIG. 7B, the system inlet 138 may be configured from one or more inlet apertures 140' through the compressor case 76. Each of these inlet apertures 140' may be an arcuate slot which extends circumferentially (e.g., uninterrupted) partially about the axial centerline 28.

Referring to FIG. 2, the system inlet 138 may be disposed at an intermediate (e.g., axial midpoint) location along the compressor section 37 and its compressor rotor 44. However, in other embodiments, the system inlet 138 may be disposed at an aft, downstream end of the compressor rotor 44, or may be spaced aft, downstream of the compressor rotor 44 along the core flowpath 34. In still other embodiments, the system inlet 138 may be disposed at a forward, upstream end of the compressor rotor 44, or may be spaced forward, upstream of the compressor rotor 44 along the core flowpath 34. The intake duct 130 and its duct flowpath 136 may thereby receive (e.g., bleed) the core air from the core flowpath 34 at various locations along the core flowpath 34.

Figure 8:
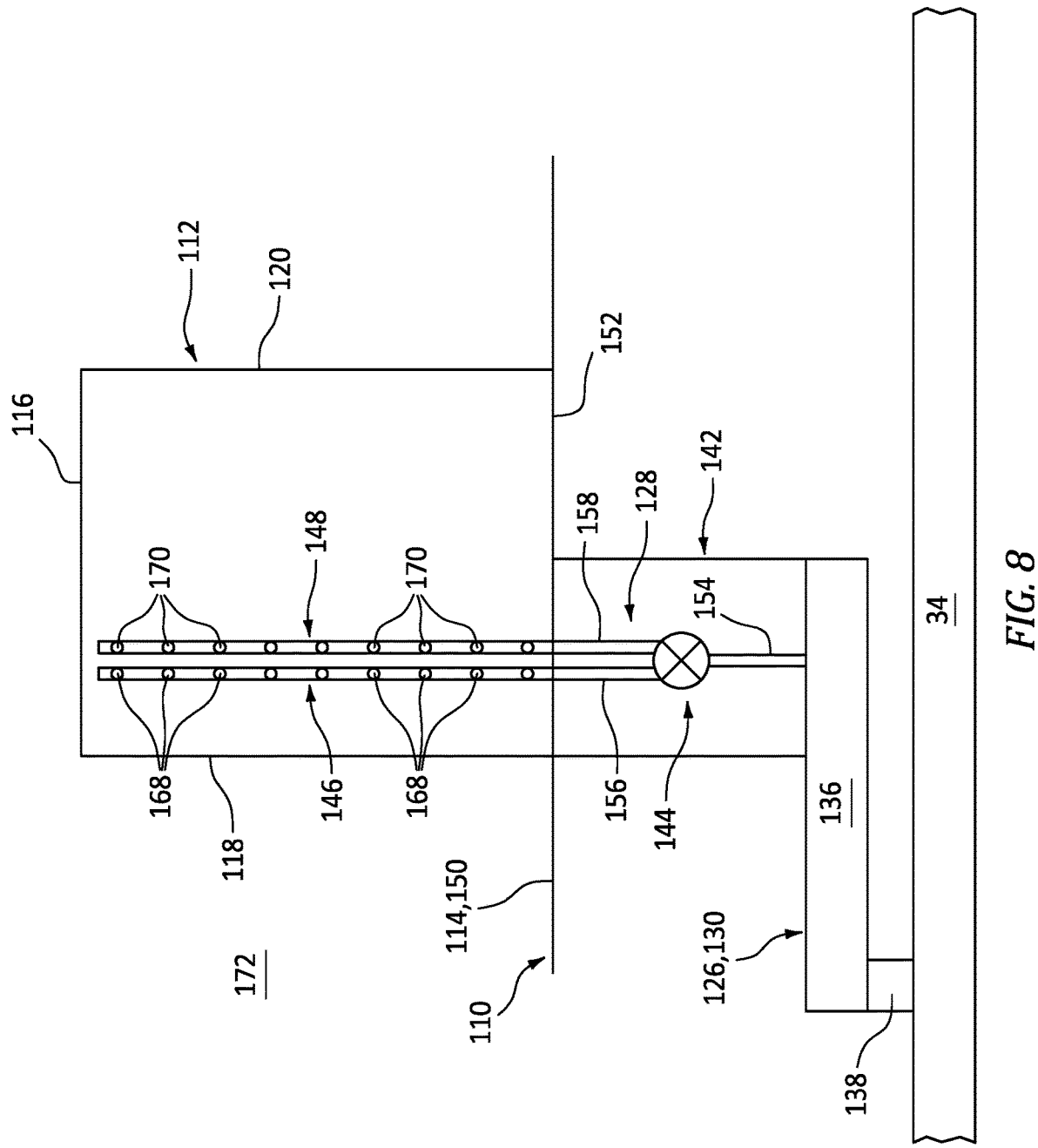
FIG. 8 is a schematic illustration of a fluid control system fluidly coupled with a core flowpath of the gas turbine engine.

Referring to FIG. 8, each fluid circuit 128 includes a manifold 142, a flow regulator 144 (e.g., a valve) and one or more internal airfoil passages 146 and 148. The manifold 142 is disposed radially between the gas turbine engine 22 and the vehicle body 110. The manifold 142 of FIG. 8, for example, projects radially out from the downstream stationary structure 66 and its outer duct wall downstream section to a sidewall 150 of the vehicle body 110 (see FIG. 1). The manifold 142 may thereby be connected to (e.g., fixedly attached to) the respective vehicle airfoil 112 through the body sidewall 150. Alternatively, the manifold 142 may extend through an aperture in the body sidewall 150 to a base 152 of the respective vehicle airfoil 112. The manifold 142 may thereby be directly connected to (e.g., fixedly attached to) the respective vehicle airfoil 112. Referring to FIG. 1, each manifold 142 may be formed integral with the downstream stationary structure 66 and included in the monolithic body 70.

The manifold 142 of FIG. 8 includes an inlet passage 154 and one or more outlet passages 156 and 158. The inlet passage 154 is configured to fluidly couple each of the outlet passages 156 and 158 to the intake duct 130 and its duct flowpath 136 through the flow regulator 144. The first outlet passage 156 is configured to fluidly couple the first airfoil passage 146 to the inlet passage 154 through the flow regulator 144. The second outlet passage 158 is configured to fluidly couple the second airfoil passage 148 to the inlet passage 154 through the flow regulator 144. The outlet passages 156 and 158 split off from the inlet passage 154 in parallel.

The flow regulator 144 of FIG. 8 is arranged with (e.g., within) the manifold 142. The flow regulator 144 may be configured as a two-way valve. The flow regulator 144, for example, may fluidly couple the inlet passage 154 to the first outlet passage 156 during a first mode. The flow regulator 144 may also fluidly decouple the inlet passage 154 from the second outlet passage 158 during the first mode. The flow regulator 144 may fluidly couple the inlet passage 154 to the second outlet passage 158 during a second mode. The flow regulator 144 may also fluidly decouple the inlet passage 154 from the first outlet passage 156 during the second mode.

Figure 9A:
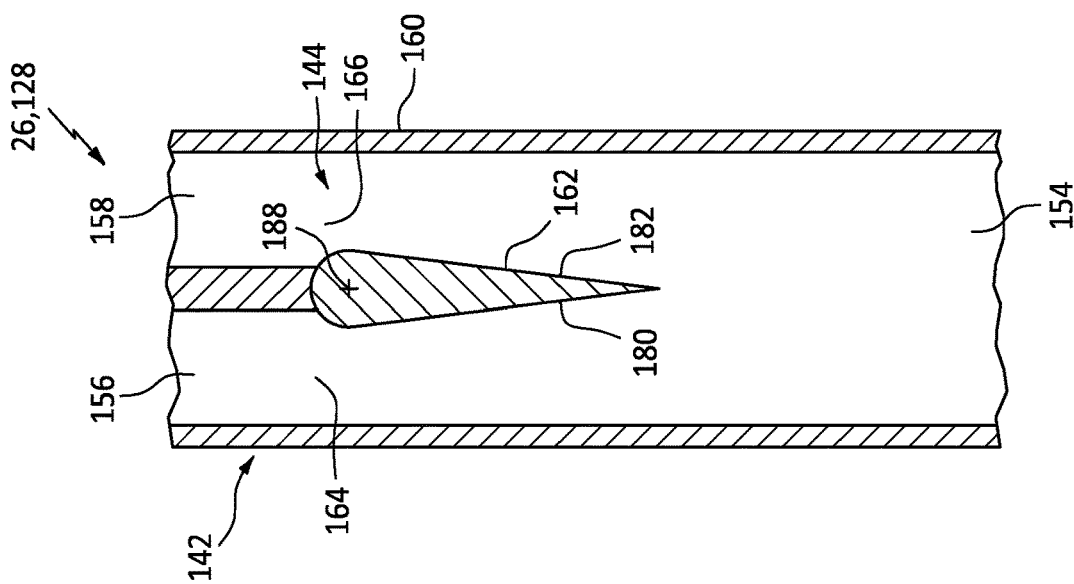
FIGS. 9A and 9B are sectional illustrations of a portion of a fluid circuit for the fluid control system with a flow regulator element in various side positions.
Figure 9B:
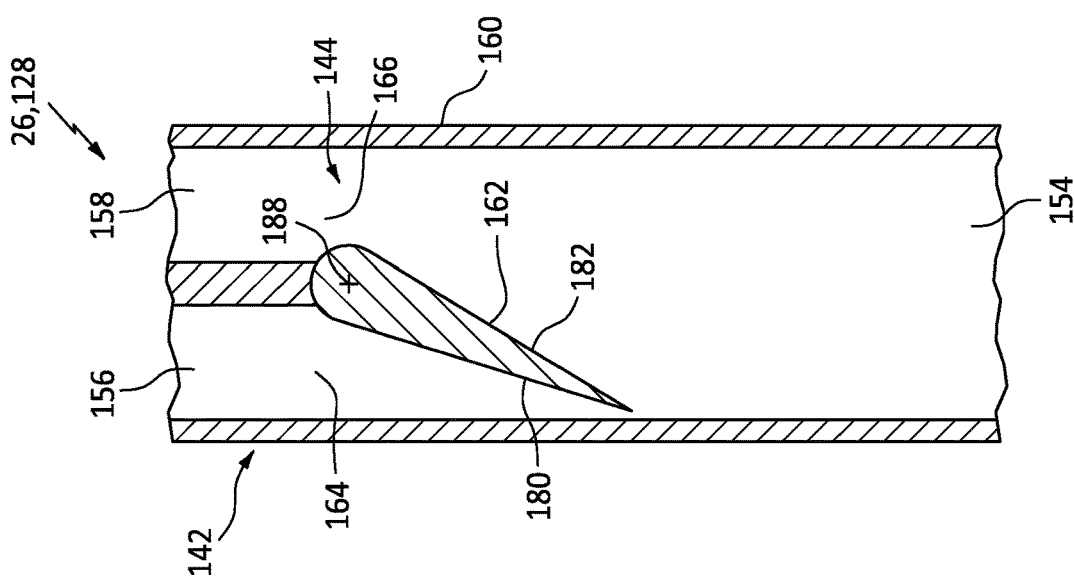

Referring to FIGS. 9A and 9B, the flow regulator 144 may include a regulator (e.g., valve) body 160 and a movable regulator (e.g., valve) element 162. The regulator body 160 may be formed as an integral portion of the manifold 142. The regulator element 162 may be configured as a pivotable flap. The regulator element 162, for example, may be pivotable between an open first position (e.g., see FIG. 9A) and an open second position (e.g., see FIG. 9B). When the regulator element 162 is in the first position of FIG. 9A, the regulator element 162 uncovers an inlet opening 164 to the first outlet passage 156 and covers an inlet opening 166 to the second outlet passage 158. When the regulator element 162 is in the second position of FIG. 9B, the regulator element 162 covers the inlet opening 164 to the first outlet passage 156 and uncovers the inlet opening 166 to the second outlet passage 158. Of course, various other types of flow regulator configurations are known in the art, and the present disclosure is not limited to any particular ones thereof.

Figure 6:
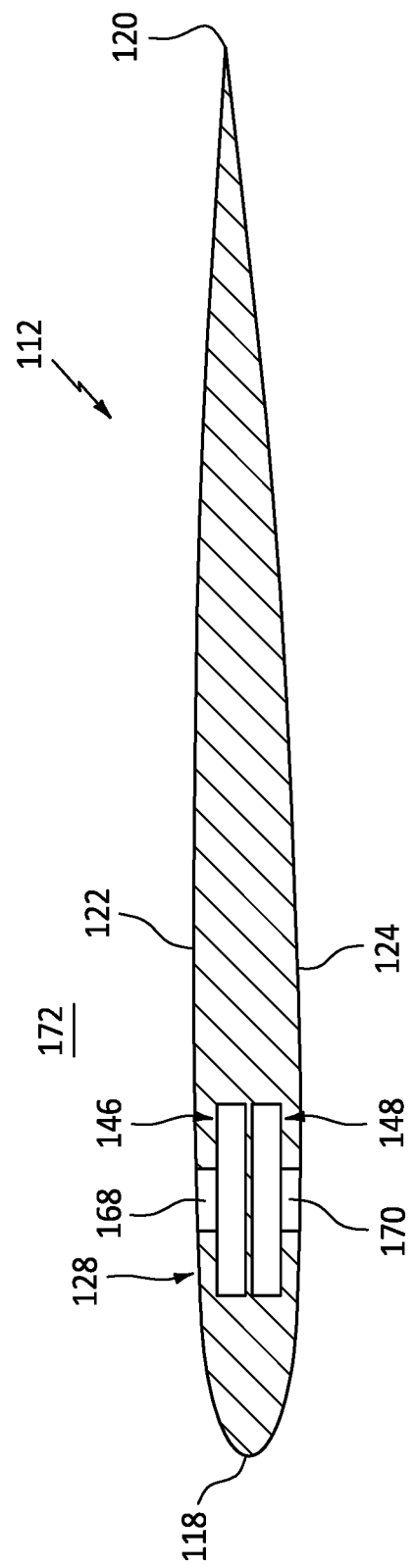
FIG. 6 is a cross-sectional illustration of the airfoil.

Referring to FIGS. 5 and 6, each of the airfoil passages 146 and 148 extends within the respective vehicle airfoil 112. Each airfoil passage 146, 148 of FIG. 5, for example, extends spanwise from the airfoil base 152 towards (e.g., to) an endwall of the respective vehicle airfoil 112 forming the airfoil tip 116. Referring to FIG. 6, each airfoil passage 146, 148 may be disposed at (e.g., on, adjacent or proximate) the airfoil leading edge 118. Referring to FIGS. 5 and 6, each airfoil passage 146, 148 may be fluidly coupled with one or more respective apertures 168, 170 in a respective one of the airfoil surfaces 122, 124. The first apertures 168 of FIG. 5 are distributed spanwise along the first airfoil passage 146, and project into the respective vehicle airfoil 112 from the airfoil first surface 122. The second apertures 170 of FIG. 5 are distributed spanwise along the second airfoil passage 148, and project into the respective vehicle airfoil 112 from the airfoil second surface 124. Note, while the airfoil apertures 168 and 170 are shown in linear arrays at the leading edge 118, the present disclosure is not limited to such an exemplary arrangement. The airfoil apertures 168, 170, for example, may be arranged in multiple arrays and/or may be disposed at an intermediate or other chordwise location along the respective airfoil surface 122, 124. Furthermore, while the airfoil apertures 168 and 170 are shown with circular geometries, one or more or all of the airfoil apertures 168 and/or 170 may each alternatively have a polygonal and/or elongated geometry. For example, one or more of the airfoil apertures 168, 170 may be replaced with an elongated slot.

Referring to FIG. 2, during gas turbine engine operation, a (e.g., relatively small) quantity of the core gas may be directed (e.g., bled) from the core flowpath 34 into the intake duct 130 and its duct flowpath 136 through the system inlet 138. This bled core gas is directed into one or more or all of the fluid circuits 128 through the inlet passage(s) 154 as control gas.

Within the fluid circuit 128 of FIG. 8 and during the first mode of FIG. 9A, (e.g., all of) the control gas within the inlet passage 154 is directed through the flow regulator 144 to the first outlet passage 156. The control gas subsequently flows into and through the first airfoil passage 146. The first apertures 168 direct (e.g., exhaust) this control gas out of the respective vehicle airfoil 112 into an external environment 172 to flow along the airfoil first surface 122; see FIG. 6. Referring to FIG. 10A, the exhausted control gas flowing into the external environment 172 and/or along the airfoil first surface 122 may functionally (e.g., virtually) change an aerodynamic characteristic of the respective vehicle airfoil 112. More particularly, the exhaust control gas may form a layer of boundary layer gas 174 between the airfoil first surface 122 and ambient air flowing along the airfoil first surface 122 thereby functionally displacing the airfoil first surface 122 laterally outward. The exhaust control gas may therefore functionally change an aerodynamic profile of the respective vehicle airfoil 112.

By contrast, within the fluid circuit 128 of FIG. 8 and during the second mode of FIG. 9B, (e.g., all of) the control gas within the inlet passage 154 is directed through the flow regulator 144 to the second outlet passage 158. The control gas subsequently flows into and through the second airfoil passage 148. The second apertures 170 direct (e.g., exhaust) this control gas out of the respective vehicle airfoil 112 into the external environment 172 to flow along the airfoil second surface 124; see FIG. 6. Referring to FIG. 10B, the exhausted control gas flowing into the external environment 172 and/or along the airfoil second surface 124 may functionally (e.g., virtually) change an aerodynamic characteristic of the respective vehicle airfoil 112. More particularly, the exhaust control gas may form a layer of boundary layer gas 174 between the airfoil second surface 124 and ambient air flowing along the airfoil second surface 124 thereby functionally displacing the airfoil second surface 124 laterally outward. The exhaust control gas may therefore functionally change the aerodynamic profile of the respective vehicle airfoil 112.

By selectively directing the control gas out of the first apertures 168 and/or the second apertures 170, the fluid control system 26 may configure the airfoil first surface 122 as a pressure side surface and the airfoil second surface 124 as a suction side surface, or vice versa. The fluid control system 26 may thereby maneuver (e.g., control a flight direction/a flight path of) the aerial vehicle by selectively exhausting the control gas out of the first apertures 168 and/or the second apertures 170. By using the control gas to influence/control aerial vehicle flight, the vehicle airfoils 112 may be configured as fixed/stationary airfoils. The aerial vehicle may therefore be configured without traditional (e.g., electric, hydraulic, pneumatic, etc.) actuators for controlling (e.g., trimming) variable position airfoils. This may reduce the complexity, weight, size and cost of the aerial vehicle.

The flow regulator 144 is described above with respect to FIGS. 9A and 9B as being in open-closed positions; e.g., a position where one of the outlet passages 156, 158 is opened and where one of the outlet passages 158, 156 is closed. However, in some embodiments, the flow regulator 144 may also be configured to open both of the outlet passages 156 and 158. For example, referring to FIG. 11, the regulator element 162 may be pivoted to an intermediate position between the first position of FIG. 9A and the second position of FIG. 9B that uncovers both passage inlets 164 and 166.

Figure 11:
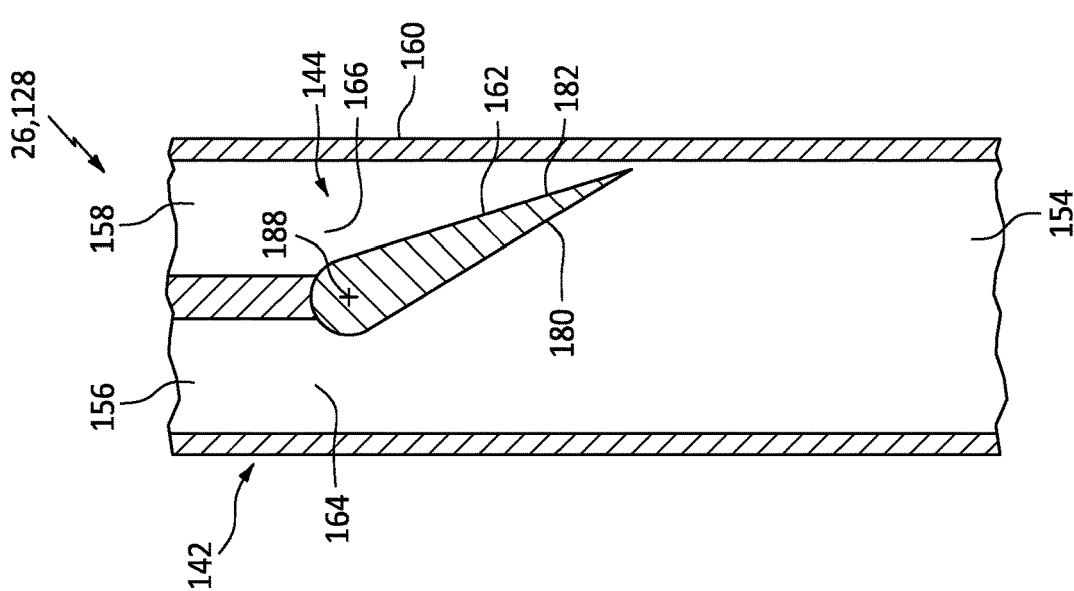
FIG. 11 is a sectional illustration of a portion of the fluid circuit with the flow regulator element in an intermediate position.

In some embodiments, referring to FIGS. 9A, 9B and 11, each flow regulator 144 may always direct at least some or all of the control gas into one or more of the outlet passages 156 and 158. In other embodiments however, referring to FIGS. 12A-C or FIGS. 13A-C, the flow regulator 144 may alternatively be configured to shut off control gas flow or direct the control gas elsewhere during at least one mode of operation.

Figure 12C:
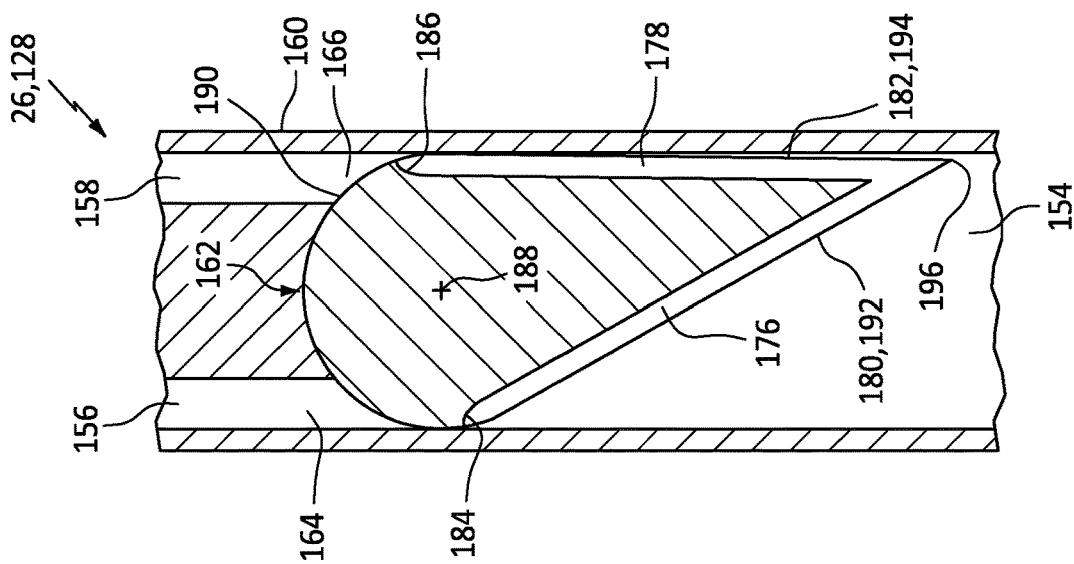
FIGS. 12A-C are sectional illustrations of a portion of the fluid circuit for the fluid control system with another flow regulator element in various positions.
Figure 12B:
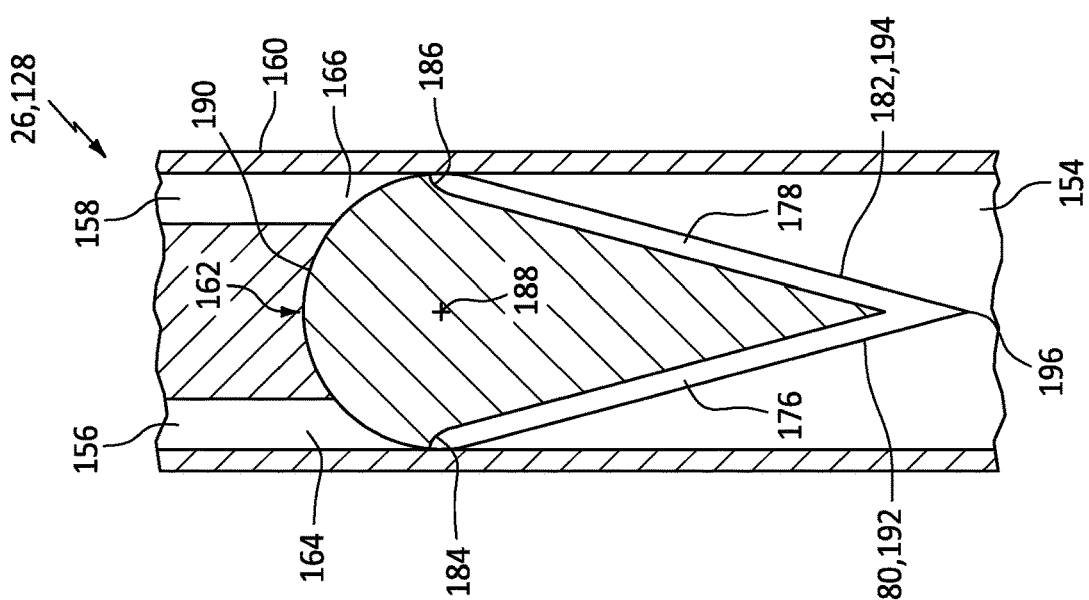
Figure 12A:
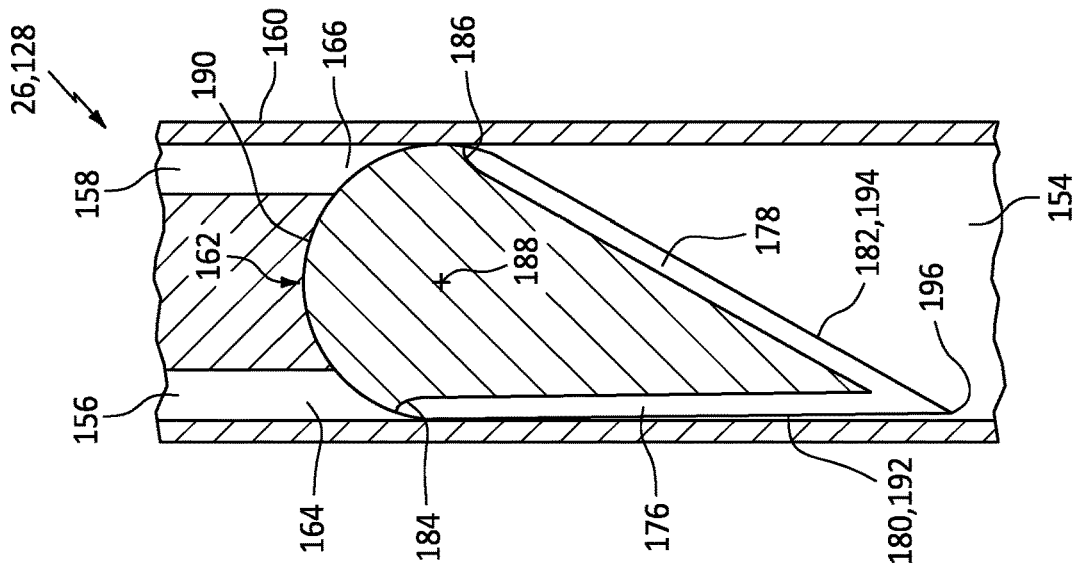

Referring to FIGS. 12A-C, the regulator element 162 may include one or more side channels 176 and 178; e.g., grooves. The first side channel 176 is disposed on a first side 180 of the regulator element 162. The second side channel 178 is disposed on a second side 182 of the regulator element 162. The first side channel 176 is configured to provide a fluid coupling between the inlet passage 154 and the first outlet passage 156 when the regulator element 162 is in its first position of FIG. 12A. However, when the regulator element 162 is in the intermediate position of FIG. 12B or the second position of FIG. 12C, an end 184 of the first side channel 176 fluidly decouples the inlet passage 154 from the first outlet passage 156. Similarly, the second side channel 178 is configured to provide a fluid coupling between the inlet passage 154 and the second outlet passage 158 when the regulator element 162 is in its second position of FIG. 12C. However, when the regulator element 162 is in the intermediate position of FIG. 12B or the first position of FIG. 12A, an end 186 of the second side channel 178 fluidly decouples the inlet passage 154 from the second outlet passage 158. With this arrangement, the regulator element 162 may be positioned in its intermediate position of FIG. 12B to cutoff the flow of the control gas to both of the outlet passages 156 and 158 and, thus, the flow of the control gas to both of the airfoil passages 146 and 148; see FIG. 6.

The regulator element 162 may have a tapered (e.g., teardrop-shaped) cross-sectional geometry when viewed, for example, in a reference plane perpendicular to a pivot axis 188 of the regulator element 162. The regulator element 162 of FIGS. 12A-C, for example, includes an arcuate base surface 190, a first side surface 192 and a second side surface 194. The arcuate base surface 190 extends circumferentially about the pivot axis 188 between and to downstream ends of the side surfaces 192 and 194. The first side surface 192 is disposed at the first side 180 of the regulator element 162, and may have a planar (e.g., straight line) geometry. The second side surface 194 is disposed at the second side 182 of the regulator element 162, and may have a planar (e.g., straight line) geometry. These side surfaces 192 and 194 extend along the element sides 180 and 182 to and may meet at a leading edge 196 of the regulator element 162. The first side channel 176 projects laterally into the regulator element 162 from the first side surface 192. This first side channel 176 projects longitudinally into the regulator element 162 from the leading edge 196 to the respective channel end 184. The second side channel 178 projects laterally into the regulator element 162 from the second side surface 194. This second side channel 178 projects longitudinally into the regulator element 162 from the leading edge 196 to the respective channel end 186.

Figure 13A:
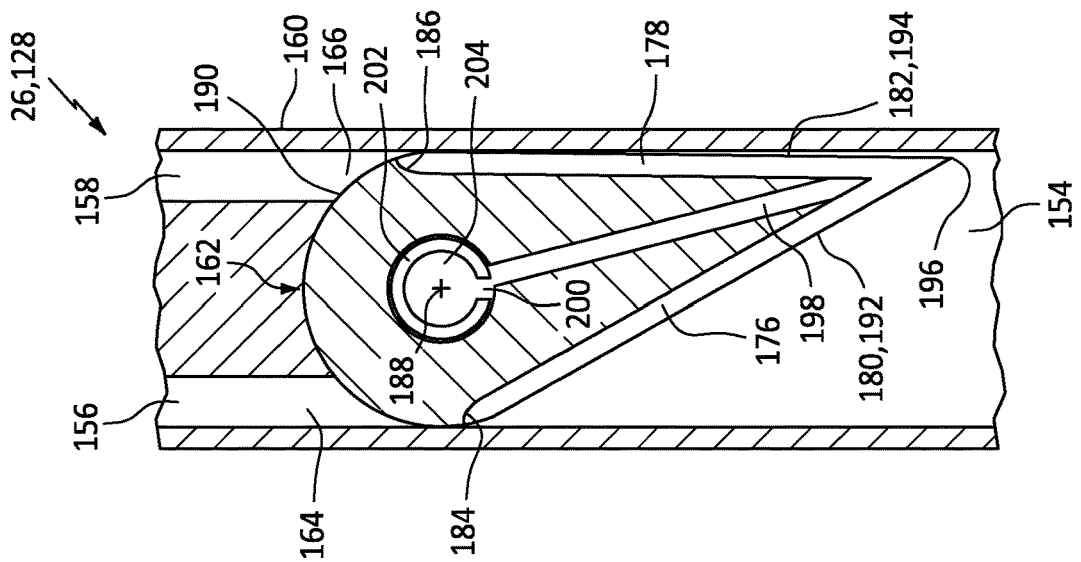
FIGS. 13A-C are sectional illustrations of a portion of the fluid circuit for the fluid control system with still another flow regulator element in various positions.
Figure 13B:
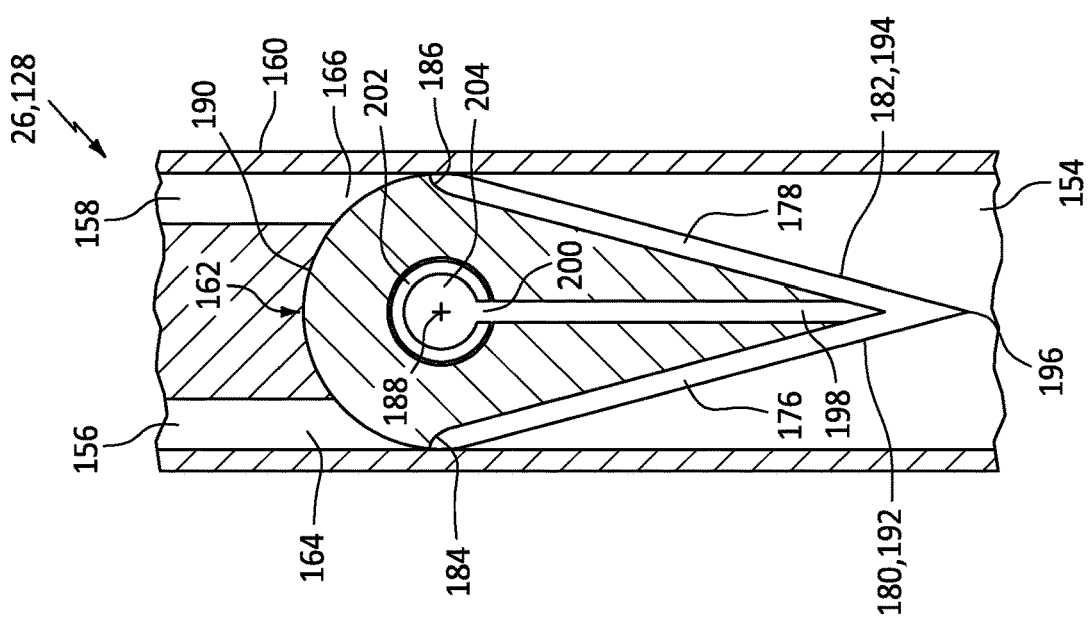
Figure 13C:
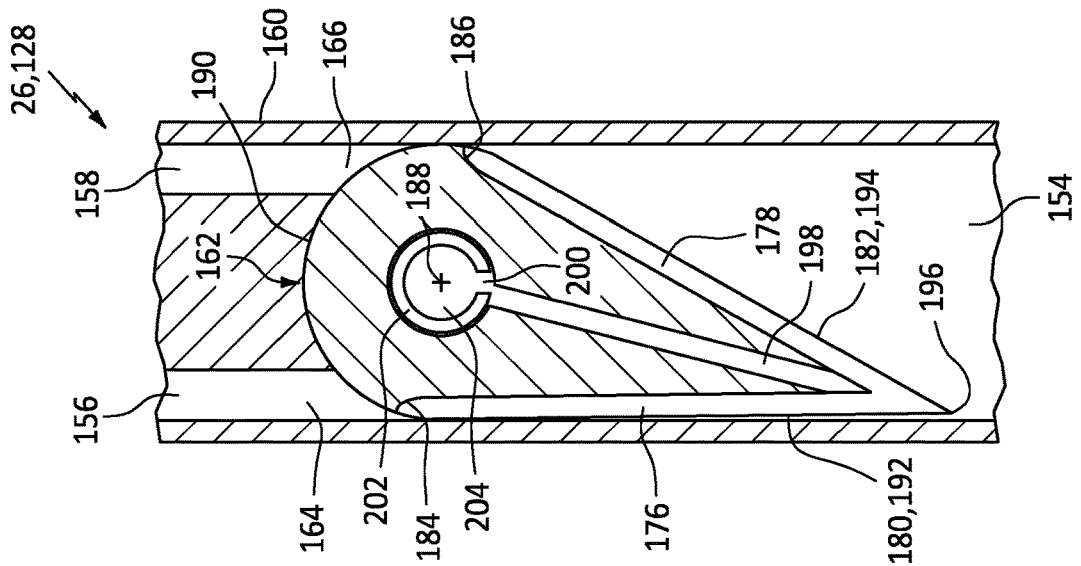

Referring to FIGS. 13A-C, the regulator element 162 may have a similar configuration to that described with respect to FIGS. 12A-C. However, the regulator element 162 of FIGS. 13A-C also includes at least one internal volume 198; e.g., a passage, a bore, etc. This internal volume 198 is configured to align with an aperture 200 in a pin 202 (e.g., a pivot shaft) for the regulator element 162 in its intermediate position of FIG. 13B. The internal volume 198 may thereby fluidly couple the inlet passage 154 to a third outlet passage 204 (e.g., a bore) extending within/through the pin 202 when the regulator element 162 is in the intermediate position. However, when the regulator element 162 is in the first position of FIG. 13A or the second position of FIG. 13C, the internal volume 198 may be (e.g., completely) misaligned with the aperture 200 thereby fluidly decoupling the inlet passage 154 from the third outlet passage 204. A sidewall of the pin 202, for example, may block/cover an outlet from the internal volume 198 when the regulator element 162 is in the first position of FIG. 13A or the second position of FIG. 13C. The internal volume 198 of FIGS. 13A-C may project longitudinally into the regulator element 162 from the leading edge 196 to its outlet within a central region of the regulator element 162.

Figure 14:
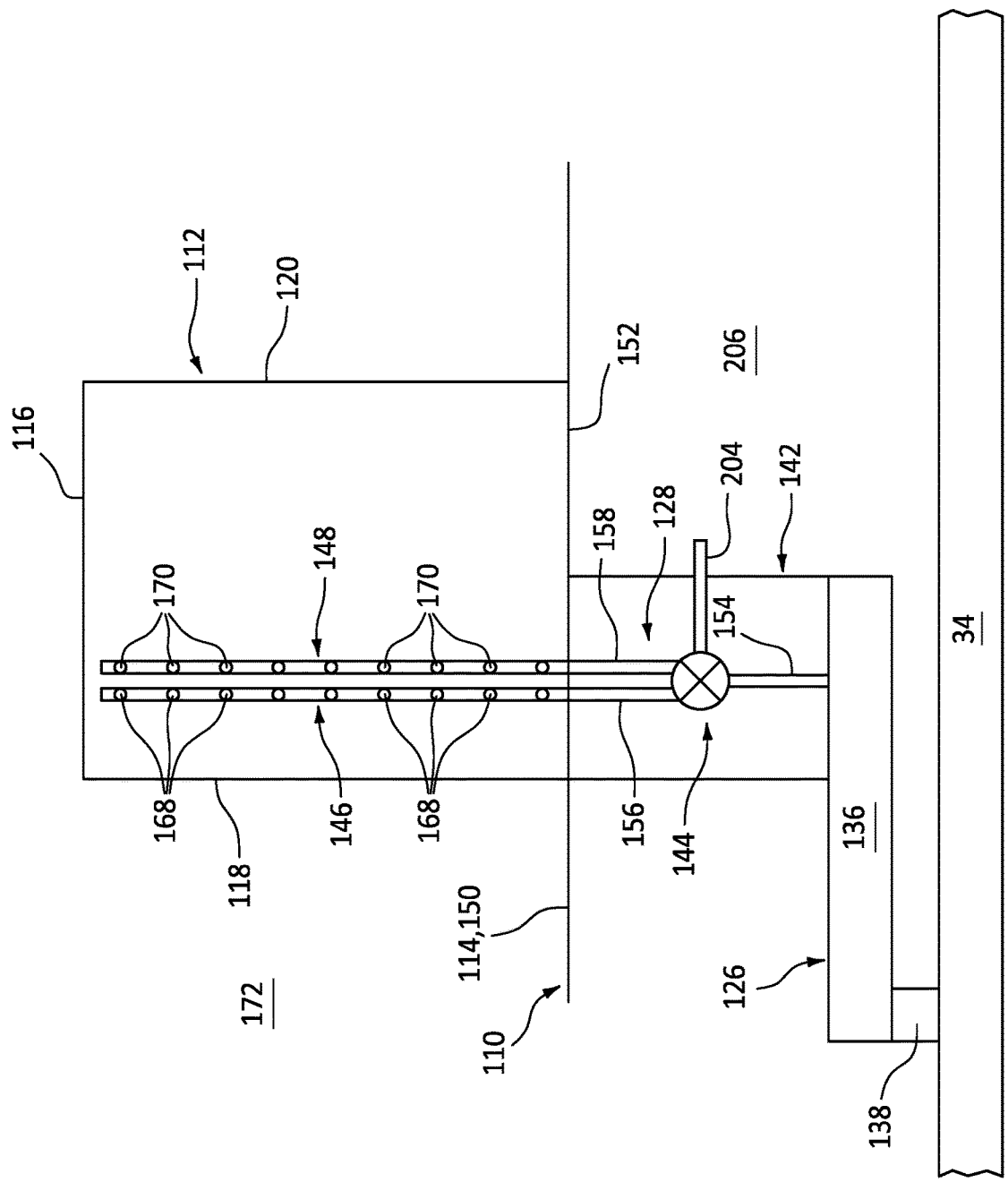
FIG. 14 is a schematic illustration of the fluid control system fluidly coupled with the core flowpath and a plenum outside of the gas turbine engine.
Figure 15:
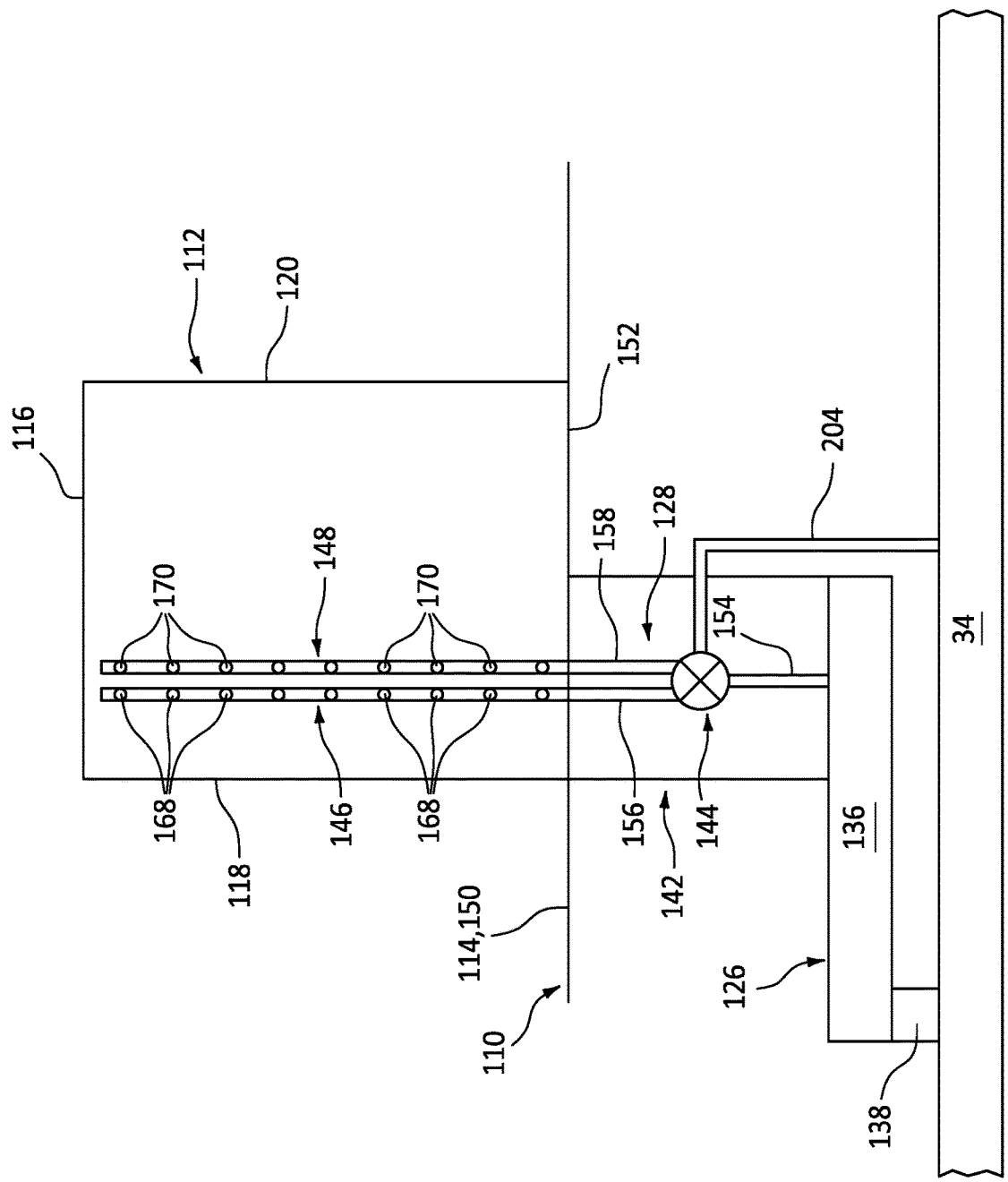
FIG. 15 is a schematic illustration of the fluid control system fluidly coupled with the core flowpath at multiple locations.

Referring to FIG. 14, the third outlet passage 204 may be fluidly coupled with a plenum 206 (see also FIG. 1) within the vehicle airframe 24. This plenum 206 may be between and formed by the gas turbine engine 22 and its static engine structure 42 and the vehicle body 110 and its sidewall 150. The fluid circuit 128 may thereby vent at least some or all of the control gas when the control gas is not needed for controlling aerial vehicle flight. Within the plenum 206, the vented control gas may also provide gas turbine engine cooling. In other embodiments, however, the third outlet passage 204 may also or alternatively vent the control gas into the exterior environment 172. Alternatively, referring to FIG. 15, the third outlet passage 204 may be fluidly coupled with the core flowpath 34 at a point downstream of the system inlet 138. The fluid circuit 128 may thereby return at least some or all of the control gas to the gas turbine engine 22 for operation when the control gas is not needed for controlling aerial vehicle flight.

The gas turbine engine 22 is described above as a single spool, radial-flow turbojet gas turbine engine for ease of description. The present disclosure, however, is not limited to such an exemplary gas turbine engine. The gas turbine engine 22, for example, may alternatively be configured as an axial flow gas turbine engine. The gas turbine engine 22 may be configured as a direct drive gas turbine engine. The gas turbine engine 22 may alternatively include a gear train that connects one or more rotors together such that the rotors rotate at different speeds. The gas turbine engine 22 may be configured with a single spool (e.g., see FIG. 1), two spools, or with more than two spools. The gas turbine engine 22 may be configured as a turbofan engine, a turbojet engine, a propfan engine, a pusher fan engine or any other type of turbine engine. In addition, while the gas turbine engine 22 is described above with an exemplary reverse flow annular combustor, the gas turbine engine 22 may also or alternatively include any other type/configuration of annular, tubular (e.g., CAN), axial flow and/or reverse flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:
1. An assembly for an aerial vehicle, comprising:
an airframe including a body and an airfoil projecting out from the body, the airfoil including a first surface, a second surface, a first aperture in the first surface, and a second aperture in the second surface;

a fluid circuit configured to bleed gas through an inlet from a gas turbine engine mounted to the airframe to provide control gas, and the fluid circuit configured to selectively direct the control gas to the first aperture; and a flow regulator, wherein:

the fluid circuit directs the control gas to the first aperture during a first mode, and directs the control gas to the second aperture during a second mode;

the flow regulator is configured to fluidly couple the inlet to the first aperture and to fluidly decouple the inlet from the second aperture during the first mode; and the flow regulator is configured to fluidly couple the inlet to the second aperture and to fluidly decouple the inlet from the first aperture during the second mode.

2. The assembly of claim 1, wherein the first aperture is configured to exhaust the control gas along the first surface to change an aerodynamic profile of the airfoil using the control gas.

3. The assembly of claim 1, wherein the fluid circuit is configured to selectively direct the control gas to the first aperture to maneuver the aerial vehicle.

4. The assembly of claim 1, wherein
the airfoil extends laterally between the first surface and the second surface.

5. The assembly of claim 1, wherein the flow regulator is configured to fluidly decouple the inlet from the first aperture and the second aperture during a third mode.

6. The assembly of claim 1, wherein
the gas turbine engine includes a stationary structure and a rotating structure at least partially housed within the stationary structure;

the fluid circuit comprises a manifold with a first passage between the gas turbine engine and the airfoil, and the first passage fluidly couples the gas turbine engine and the first aperture; and the stationary structure and the manifold are included in a monolithic body.

7. The assembly of claim 6, wherein
the airfoil extends laterally between the first surface and the second surface; and the manifold further comprises a second passage between the gas turbine engine and the airfoil, and the second passage fluidly couples the gas turbine engine and the second aperture.

8. The assembly of claim 7, wherein the flow regulator is upstream of the first passage and the second passage.

9. The assembly of claim 1, wherein
the gas turbine engine includes a stationary structure and a rotating structure at least partially housed within the stationary structure; and the airfoil is fixedly connected to the stationary structure.

10. The assembly of claim 1, wherein
the gas turbine engine comprises a compressor section; and the fluid circuit is configured to bleed the gas from the compressor section to provide the control gas.

11. The assembly of claim 1, wherein the gas turbine engine is housed within the body.

12. The assembly of claim 1, wherein the gas turbine engine is configured to provide thrust for propelling the aerial vehicle.

13. An assembly for an aerial vehicle, comprising:
a gas turbine engine comprising a compressor section;

a control surface comprising an airfoil outside of the gas turbine engine, the airfoil including a first surface, a second surface, a first aperture in the first surface, and a second aperture in the second surface; and a fluid circuit comprising an inlet configured to bleed gas from the compressor section to provide control gas, the fluid circuit configured to selectively exhaust the control gas through the first aperture along the first surface during a first mode to change a first aerodynamic characteristic of the airfoil, and the fluid circuit further configured to selectively exhaust the control gas through the second aperture along the second surface during a second mode to change a second aerodynamic characteristic of the airfoil.

14. The assembly of claim 13, wherein
the airfoil extends laterally between the first surface and the second surface.

15. The assembly of claim 13, wherein
the fluid circuit is further arranged with a flow regulator; and the flow regulator is configured to fluidly couple the inlet to the first aperture during the first mode, and the flow regulator is configured to fluidly decouple the inlet from the first aperture during the second mode.

16. The assembly of claim 13, wherein
the gas turbine engine includes a stationary structure and a rotating structure at least partially housed within the stationary structure;

the fluid circuit comprises a manifold between the gas turbine engine and the airfoil, and the manifold fluidly couples the compressor section and the first aperture; and the stationary structure and the manifold are included in a monolithic body.

17. An assembly for an aerial vehicle, comprising:
a gas turbine engine including a stationary structure and a rotating structure at least partially housed within the stationary structure;

a control surface comprising an airfoil, the airfoil including a first surface, a second surface, a first aperture in the first surface, and a second aperture in the second surface;

a fluid circuit configured to bleed gas from the gas turbine engine through an inlet to provide control gas, the fluid circuit configured to selectively direct the control gas from the inlet to the first aperture through a manifold between the gas turbine engine and the control surface during a first mode, and the fluid circuit configured to selectively direct the control gas from the inlet to the second aperture through the manifold between the gas turbine engine and the control surface during the second mode; and the stationary structure and the manifold included in a monolithic body.

\* \* \* \* \*